(12) United States Patent
Adam

(10) Patent No.: US 7,899,647 B2
(45) Date of Patent: Mar. 1, 2011

(54) METHOD AND DEVICE FOR IDENTIFYING THE OPERATING CONDITION OF A TURBINE

(75) Inventor: Gottfried Adam, Neunkirchen-Seelscheid (DE)

(73) Assignee: Siemens Aktiengesellschaft, Munich (DE)

( * ) Notice: Subject to any disclaimer, the term of this patent is extended or adjusted under 35 U.S.C. 154(b) by 1400 days.

(21) Appl. No.: 10/570,514

(22) PCT Filed: Jul. 23, 2004

(86) PCT No.: PCT/EP2004/008290

§ 371 (c)(1),
(2), (4) Date: Mar. 1, 2006

(87) PCT Pub. No.: WO2005/028814

PCT Pub. Date: Mar. 31, 2005

(65) Prior Publication Data

US 2006/0245914 A1    Nov. 2, 2006

(30) Foreign Application Priority Data

Sep. 1, 2003    (EP)    .................. 03019868

(51) Int. Cl.
G06F 11/00    (2006.01)
G06F 19/00    (2006.01)
(52) U.S. Cl. ..................................... 702/182
(58) Field of Classification Search .................. 702/182
See application file for complete search history.

(56) References Cited

U.S. PATENT DOCUMENTS 4,735,052 A * 4/1988 Maeda et al. .................. 60/733
4,955,191 A * 9/1990 Okamoto et al. .............. 60/39.3
5,878,566 A   3/1999 Endo et al.
2001/0022078 A1* 9/2001 Horii et al. ................ 60/39.182
2002/0178730 A1* 12/2002 Ganz et al. .................... 60/773
2002/0183916 A1* 12/2002 Cleary ......................... 701/100
2003/0019202 A1* 1/2003 Horii et al. .................... 60/39.3
2004/0093850 A1* 5/2004 Horii et al. .................... 60/39.3
2004/0219079 A1* 11/2004 Hagen et al. ................. 422/194
2004/0255596 A1* 12/2004 Horii et al. .................... 60/775
2006/0107666 A1* 5/2006 Kothnur et al. ............... 60/773

FOREIGN PATENT DOCUMENTS

| EP | 1 118 920 A1 | 7/2001 |
| GB | 989011 | 4/1965 |
| JP | 02 064232 A | 3/1990 |

* cited by examiner

*Primary Examiner*—Cindy Hien-Dieu Khuu

(57) ABSTRACT

The invention relates to a method for identifying the operating condition of a turbine during operation. According to said method, a hot waste gas flows through a waste gas housing and the temperature of the waste gas in said housing is detected using temporal resolution. The aim of the invention is to provide a method for identifying the operating condition of a turbine during operation, which identifies and displays systematic errors. To achieve this, the numerous measured temperature values for the waste gas are respectively detected using local resolution with reference to the origin of an imaginary Cartesian co-ordinate system. The focal point of the temperature distribution is then determined, a vector between the origin of the Cartesian co-ordinate system and the focal point of the temperature distribution being used as an indicator for the operating condition of the turbines.

18 Claims, 4 Drawing Sheets

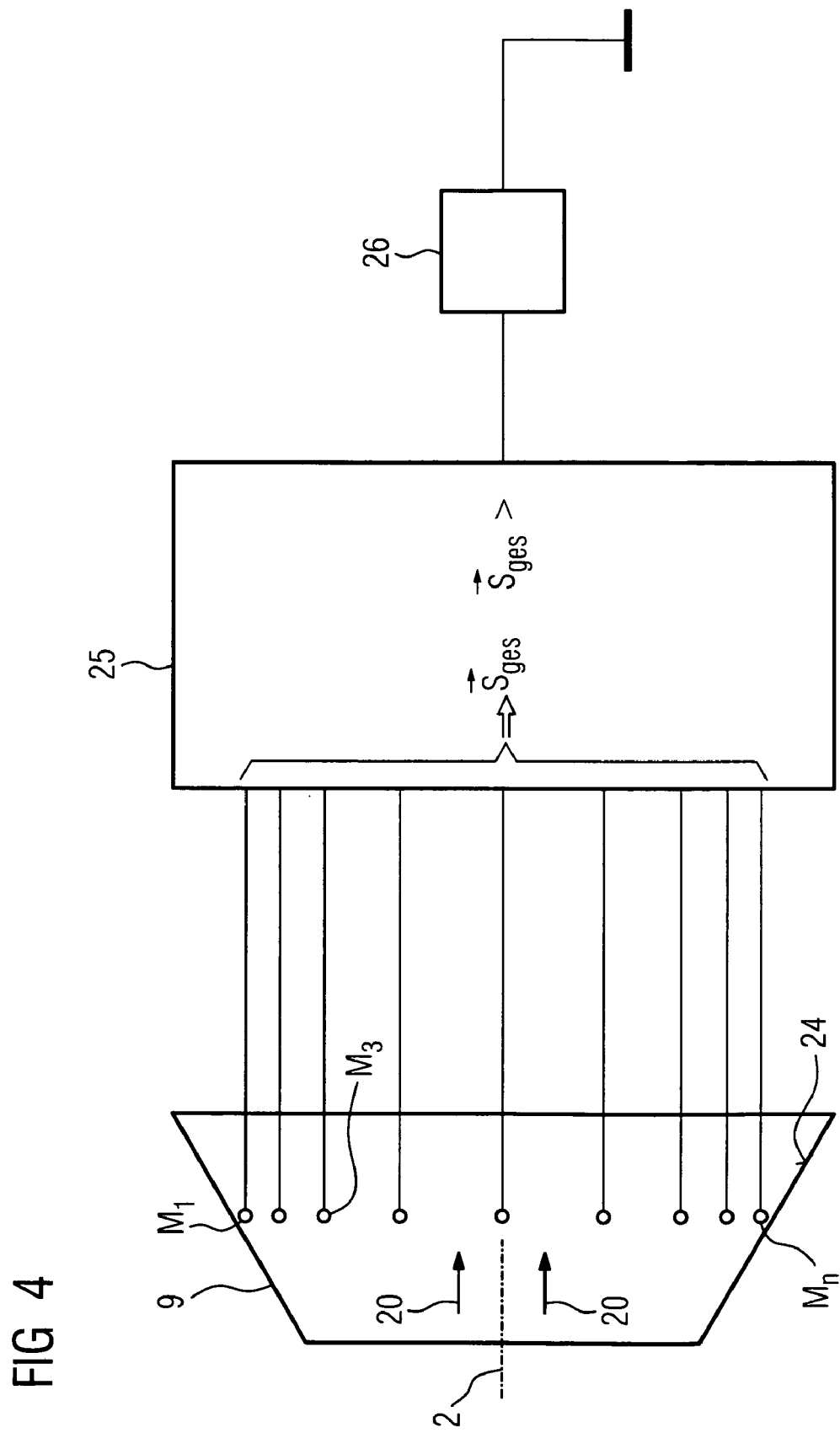

METHOD AND DEVICE FOR IDENTIFYING THE OPERATING CONDITION OF A TURBINE

CROSS REFERENCE TO RELATED APPLICATIONS

This application is the U.S. National Stage of International Application No. PCT/EP2004/008290, filed Jul. 23, 2004 and claims the benefit thereof. The International Application claims the benefits of European Patent application No. 03019868.3 filed Sep. 1, 2003, all of the applications are incorporated by reference herein in their entirety.

FIELD OF THE INVENTION

A method for identifying an operating state during operation of a turbine, and a device for identifying an operating state during operation of a turbine.

The invention relates to a method for identifying an operating state during operation of a turbine in accordance with the claims, and to a device for carrying out the method in accordance with the claims.

BACKGROUND OF THE INVENTION

It is known for the purpose of identifying an operating state of a turbine to detect and evaluate the temperatures prevailing in the exhaust gas continuously. Temperature measuring devices that detect the temperatures of the exhaust gas are arranged distributed for this purpose coaxially and uniformly on the inner wall of the exhaust gas housing. Extreme value comparisons are carried out in order to evaluate the measured exhaust gas temperatures. The maximum and minimum occurring temperatures are detected for each measuring point during trial operation, and a temperature interval is thereby determined. A disturbance is determined when the temperature measuring element detects a temperature that lies outside its previously measured temperature interval.

It is also known to determine the difference from the time-averaged temperature value of a temperature measuring device and the instantaneous temperature, in order to determine the operating state.

These evaluations have the disadvantage that small systematic variations in the exit temperatures that lie below the prescribed limits remain unconsidered.

It is known, furthermore, from US2002/183916 A1 to calculate the angle of rotation of the exit temperature field.

The determined angle of rotation is used to normalize the exit temperature field in order to enable temperature measuring points to be used to deduce dedicated Can combustion chambers.

Moreover, EP 1 118 920 A1 discloses vibration monitoring of rotating components. One or more vibration sensors arranged offset from one another are provided for this purpose. The recorded amplitudes and phase angles of the vibrations or of the temporary displacements caused by the vibrations are detected with the aid of these sensors and decomposed into two mutually perpendicular components that are subsequently converted with the formation in each case of a sliding arithmetic mean value to form a resulting variable with amplitude and phase angle, which variable is then evaluated for the purpose of analyzing state.

Again, a display for a turbine exit temperature field is known from JP 02-064232.

SUMMARY OF THE INVENTION

It is therefore the object of the present invention to specify a method for identifying an operating state during operation of a turbine and with the aid of which systematic variations in the operating state can be identified and displayed. It is also an object of the invention to specify a device corresponding thereto.

The object directed to the method is achieved by the features of claims. Advantageous developments are specified in the subclaims.

The invention adopts a new path for identifying an operating state during operation of a turbine. To date, spatial temperature measurements in which the exit temperature of the exhaust gas was detected have been performed in the exhaust gas duct at a number of positions. The spatial position of each detected temperature has previously remained unconsidered in this case. All the detected temperatures together with their respectively associated spatial position are now combined with one another with the formation of moments to form a resulting variable by means of which systematic variations can be identified more quickly and more accurately.

The exhaust gas temperatures of an instant are plotted in a coordinate system while taking account of the location at which they are detected. Thereafter, each measured temperature value is projected onto the two axes of the coordinate system and is therefore respectively decomposed into two spatial components perpendicular to one another in this case and respectively directed either positively or negatively, the identically directed spatial components subsequently being summed up for each axis component by component with reference to a respective reference value and with the formation of moments to form two moment sums, each reference value being selected such that the oppositely directed moment sums are equally large, and that thereafter a point composed from the two reference values is evaluated as centroid of the exit temperature distribution for the purpose of identifying the operating state of the gas turbine.

Information that has previously been below the minimal conditions is taken into account by the use of the overall information of the exit temperature distribution. Moreover, this yields a higher level of information content, which is used for the purpose of identifying states more quickly and more effectively.

In an advantageous refinement, the operating state is identified during a stationary operation of the gas turbine as a disturbance when the centroid can be represented as a vector having magnitude and angle, and when the current magnitude—orangle—of the centroid vector exhibits with reference to a magnitude—or angle—measured at an earlier instant a difference that overshoots or undershoots a tolerance value. Two centroids detected at different instants are compared with one another, their difference being monitored. If the difference overshoots a tolerance value, a disturbance of the operation of the turbine is identified. The tolerance values are determined by test operations or by empirical values.

From the opposite point of view, an undisturbed operation of the gas turbine can be diagnosed when the centroid vector remains constant in magnitude and/or angle when viewed over time.

The temporal behavior of the magnitude and the angle of the centroid vector—the centroid of the exit temperature distribution—exhibits a known response during operation of the turbine:

During undisturbed operation of the gas turbine, the centroid vector of the exit temperature distribution settles at a temporally constant magnitude with a constant angle. Here, constant means that although slight changes can occur within the fluctuation range prescribed by tolerance values, they are nevertheless not to be ascribed to systematic influences, but to random ones.

If load changes occur, these have no influence on the magnitude of the centroid vector, since the magnitude is fundamentally invariant with respect to load changes.

The angle of the centroid vector is fundamentally dependent on load changes, since these are likewise accompanied by changes in the hot gas mass flow and thus in the flow conditions within the turbine. The variation in the hot gas mass flow results from the adjustments of the compressor inlet guide vanes and/or from the variation in the fuel mass flow that is fed.

The variations in the hot gas mass flow cause a corresponding rotation of the exit temperature distribution. However, this is not synonymous with a disturbance, since this change in angle is to be ascribed to known interventions in the operation of the gas turbine.

If there is a substantial change in the magnitude or the angle of the centroid vector during stationary operation of the turbine, this is to be ascribed to a systematic variation such as, for example, blocking of the ducts by a loosened thermal shielding brick. The systematic variations are to be ascribed to defective operation or a disturbance of the gas turbine, since a known, external influence is lacking. Furthermore, combustion disturbances, which can be nozzle carbonization, on the one hand, or an altered flame alignment, on the other, lead to variation in the centroid of the exit temperature distribution. Likewise, flow fluctuations that are reflected in temperature fluctuations can lead to rotation of the angle.

A plane in which the measuring points for the temperature measuring devices lie is expediently aligned perpendicular to the principal flow direction of the exhaust gas, and the principal flow direction is parallel to the rotation axis of a shaft of the turbine. The temperatures are therefore tracked over time at an identical spacing from the rotation axis of the shaft.

In an advantageous development, the measuring points are arranged in a fashion rotationally symmetrical relative to the rotation axis. This results in an equidistant distribution that is particularly easy to evaluate because of the symmetry.

The method is suitable in general for continuously monitoring the operation. It is very particularly advantageous in this case when the method is preferably applied at every instant, that is to say continuously, during the stationary or quasi-stationary operation of the turbine, since the method delivers particularly reliable results here. The analysis of the state of the gas turbine operation with the aid of the centroid vector can, however, be carried out in principle even during a strongly transient operation—given suitable modifications—, there being a need to consider special features in transient operation. Reliable results and statements relating to the behavior of the gas turbine when traversing a transient operating state, for example starting operations and stopping operations, can consequently be investigated in detail.

The turbine is expediently designed as a gas turbine.

The object directed to the device is achieved by the features of claims. Advantageous developments are specified in the subclaims.

Each temperature measuring device is connected to an input of a single evaluation device with the aid of which an operating state can be characterized. The method described is then carried out in the evaluation device such that a signal for the operating state can therefore be displayed at the output of the evaluation device. Consequently, the evaluation device has means for recording the detected temperature and means for identifying the operating state.

In an advantageous development, a plane in which the temperature measuring devices are provided is transverse to the principal flow direction of the exhaust gas, which runs parallel to the rotation axis of a shaft of the turbine. The temperature measuring devices lying in the plane are provided at the inner wall of the exhaust gas housing such that all the spatial measured temperature values are detected at the same spacing from the rotation axis of the shaft. Identical conditions are therefore created for the temperature measuring devices; weighting of individual measuring points is not required.

The spatial measured temperature values can expediently be detected in a fashion rotationally symmetrical relative to the rotation axis.

When the turbine has an annular combustion chamber at which a number of burners are provided, and the number of burners is equal to the number of temperature measuring devices, it is possible to relate burners to the exhaust gas temperature measured in the exhaust gas duct.

If the turbine has a number of combustion chambers respectively having one burner, it is possible to relate burners to the exhaust gas temperature measured in the exhaust gas duct even over a number of temperature measuring devices when this number corresponds to the number of combustion chambers.

The turbine is advantageously designed as a gas turbine.

BRIEF DESCRIPTION OF THE DRAWINGS

The invention is explained in more detail with the aid of a drawing, in which:

FIG. 4 shows an evaluation device for the monitoring method.

DETAILED DESCRIPTION OF THE INVENTION

Figure 1:
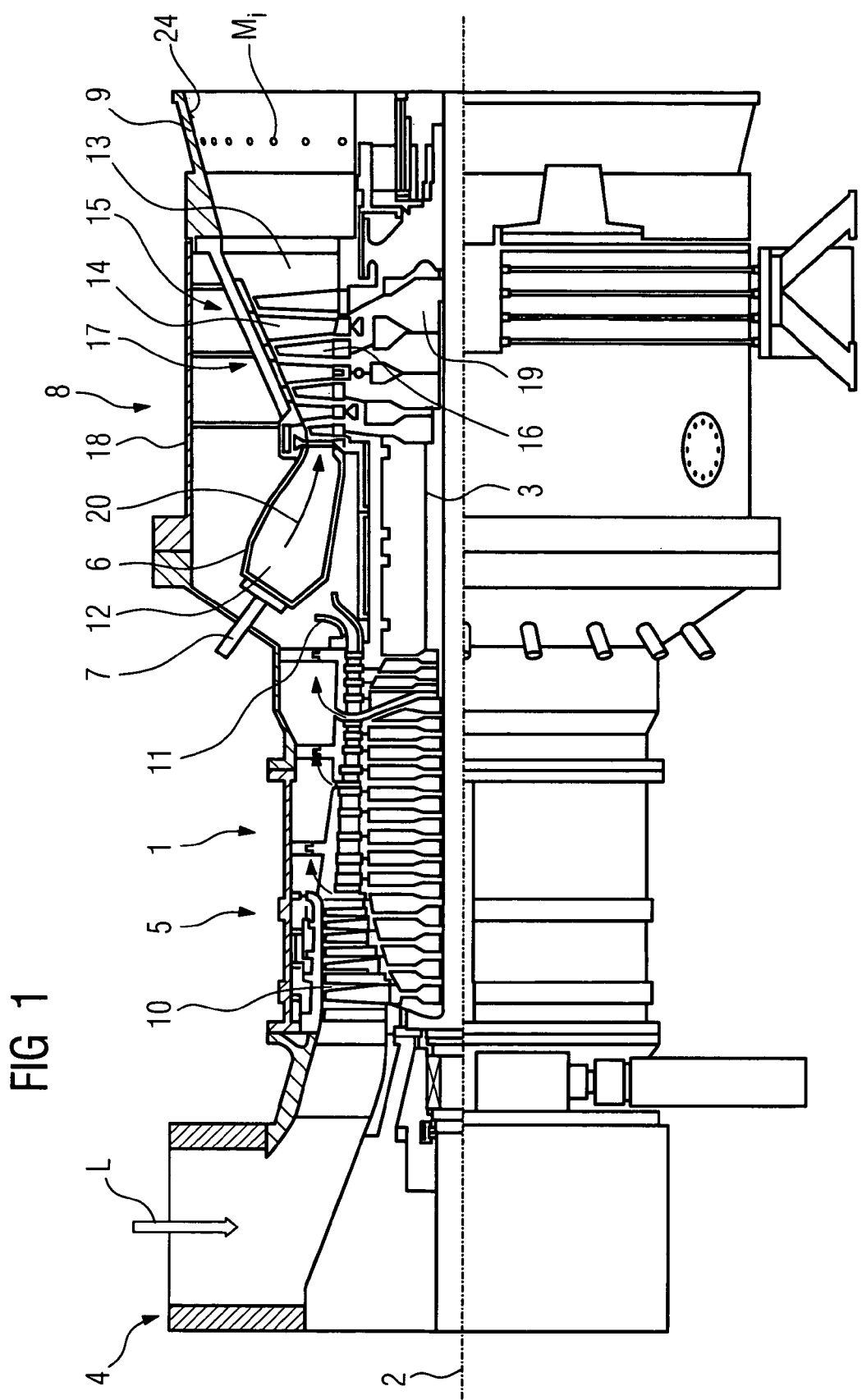
FIG. 1 shows a gas turbine in a longitudinal partial section.

FIG. 1 shows a gas turbine 1 in a longitudinal partial section. It has in the interior a rotor 3 that is mounted so as to rotate about a rotation axis 2 and is also denoted as turbine rotor or rotor shaft. Following one after the other along the rotor 3 are an inlet housing 4, a compressor 5, a toroidal annular combustion chamber 6 with a number of coaxially arranged burners 7, a turbine 8 and an exhaust gas housing 9.

Provided in the compressor 5 is an annular compressor duct 10 that tapers in cross section in the direction of the annular combustion chamber 6. Arranged at the output, on the combustion chamber side, of the compressor 5 is a diffuser 11 that is connected to the annular combustion chamber 6 in terms of flow. The annular combustion chamber 6 forms a combustion space 12 for a mixture of a fuel and compressed air L. A hot gas duct 13 is connected to the combustion space 12 in terms of flow, the exhaust gas housing 9 being arranged downstream of the hot gas duct 13.

Vane rows are arranged in a respectively alternating fashion in the compressor duct 10 and in the hot gas duct 13. A guide vane row 15 formed from guide vanes 14 is respectively followed by a moving vane row 17 formed from moving vanes 16. The stationary guide vanes 14 are connected in this case to the stator 18, whereas the moving vanes 16 are fastened on the rotor 3 by means of a turbine disk 19.

The exhaust gas duct 9 is delimited by an inner wall 24 that is concentric with the rotation axis 2 and on which twenty-four temperature measuring devices $M_i$ are arranged in a rotationally fixed fashion and distributed uniformly over the circumference. All the temperature measuring devices $M_i$ lie here in an imaginary plane that is perpendicular to the rotation axis 2.

During operation of the gas turbine 1, air L is taken in through the intake housing 4 by the compressor 5, and compressed in the compressor duct 10. The air L provided at the output of the compressor 5 on the burner side is led to the burners 7 by the diffuser 11 and mixed there with a fuel. The mixture is then burned in the combustion space 10 with the formation of a working fluid 20. From there, the working fluid 20 flows into the hot gas duct 13. The working fluid 20 expands at the guide vanes 16 arranged in the turbine 8 and at the moving vanes 18 in an impulse-transmitting manner such that the rotor 3 is driven and, with it, so is a driven machine (not illustrated) connected to it. The working fluid 20 is passed on as exhaust gas in the exhaust gas duct 9. Each temperature measuring device $M_i$ then measures the temperature $T_i$ of the exhaust gas prevailing at its location.

Figure 2:
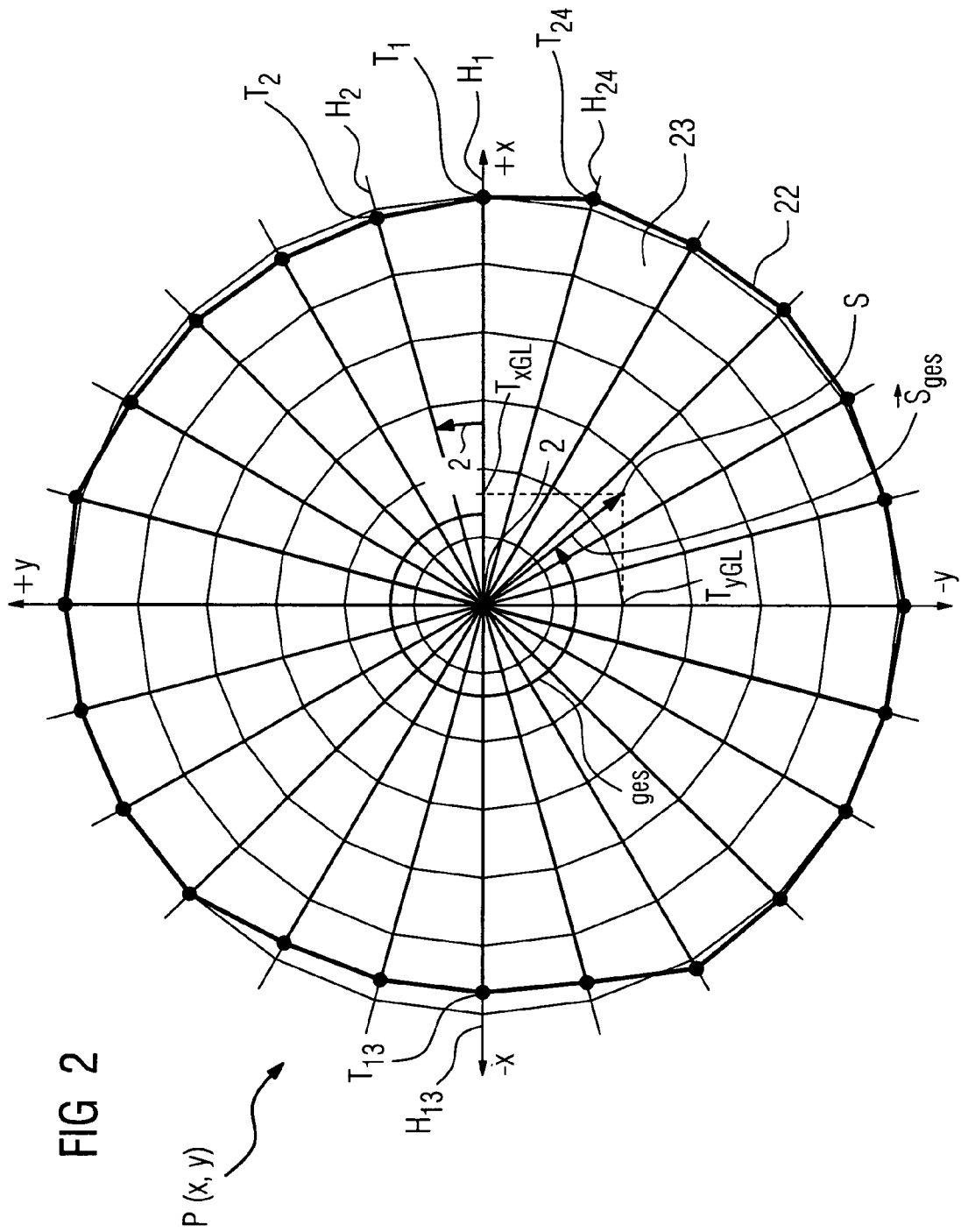
FIG. 2 shows a Cartesian coordinate system with a diagram of the exit temperature distribution.

FIG. 2 shows a Cartesian coordinate system $P(x,y)$ with an exit temperature distribution at an instant $t_0$.

The following definitions are made:

$P(x,y)$=a Cartesian coordinate system lying in the plane and which is intersected at right angles by the rotation axis 2 at the origin of coordinates $P(0,0)$, $M_i$=the temperature measuring devices whose measuring points lie in the plane, n=24, the number of temperature measuring devices, $T_i$=temperature of the temperature measuring device $M_i$, for i=1 . . . n Extending in the form of rays from the origin of coordinates $P(0,0)$ in the coordinate system $P(x,y)$ are twenty-four auxiliary straight lines $H_i$, for i=1 . . . n, in relation to each measuring point of the temperature measuring devices $M_i$. Each auxiliary straight line $H_i$ therefore exhibits with reference to the positive x-axis an angle $\Theta_i$ whose value is 15° or an integral multiple thereof.

For each temperature $T_i$ detected by the temperature measuring devices $M_i$ there is plotted on its associated auxiliary axis $H_i$ a point whose distance from the origin of coordinates $P(0,0)$ is proportional to the detected magnitude of the temperature $T_i$. This results on each auxiliary axis $H_i$, i=1 . . . n in a point dependent on the local temperature $T_i$. The known trigonometrical functions are then used for each point in accordance with $$T_{x_i} = T_i \cdot \cos(\Theta_i), \text{ for } i=1 \ldots 24 \quad (1)$$

$$T_{y_i} = T_i \cdot \sin(\Theta_i), \text{ for } i=1 \ldots 24 \quad (2)$$

to make a projection onto the two axes of the coordinate system.

In order to achieve an identical weighting of the measuring points, the temperature measuring devices $M_i$ are all arranged lying in a plane that extends perpendicular to the rotation axis 2 and therefore, at the same time, to the principal flow direction of the exhaust gas. Another nonuniform distribution of the temperature measuring devices $M_i$ over the circumference could likewise be carried out with the aid of the method.

In order to be able to determine a centroid S of the exit temperature distribution of the exhaust gas, the moments of the individual temperatures $T_i$ about the centroid S need to be in equilibrium. During the component by component consideration, that is to say for each axis of the coordinate system in each direction, it is therefore necessary in each case for the sums of the oppositely directed moments in accordance with $$\sum_{i=1}^{6} M_{+x_i} + \sum_{i=19}^{24} M_{+x_i} = \sum_{i=7}^{18} M_{-x_i} \quad (3)$$

and $$\sum_{i=1}^{12} M_{+y_i} = \sum_{i=13}^{24} M_{-y_i} \quad (4)$$

to be in equilibrium. Each individual moment is calculated from a lever arm pivoted at the centroid S and which is multiplied by the component acting at the other end of the lever arm, that is to say the effective portion of the temperature $T_i$. Since the centroid is unknown at first, the moments are calculated in the coordinate system component by component with reference to an as yet unknown reference value $T_{GL}$, in accordance with $$M_{+x_i} = (T_{+x_i} - T_{xGL}) \cdot T_{+x_i} \quad (5)$$

$$M_{-x_i} = (T_{-x_i} + T_{xGL}) \cdot T_{-x_i} \quad (6)$$

$$M_{+y_i} = (T_{+y_i} - T_{yGL}) \cdot T_{+y_i} \quad (7)$$

$$M_{-y_i} = (T_{-y_i} + T_{yGL}) \cdot T_{-y_i} \quad (8)$$

In order to calculate the centroid S, equations (5) and (6) are substituted in equation (3), and equations (7) and (8) are substituted in equation (4), and transformation is performed such that the reference value of the x-axis can be determined in accordance with $$T_{xGL} = \frac{\sum_{i=1}^{6} T_{+x_i}^2 + \sum_{i=19}^{24} T_{+x_i}^2 - \sum_{i=7}^{18} T_{-x_i}^2}{\sum_{i=1}^{6} T_{+x_i} + \sum_{i=7}^{18} T_{-x_i} + \sum_{i=19}^{24} T_{+x_i}} \quad (9)$$

and that of the y-axis can be determined in accordance with $$T_{yGL} = \frac{\sum_{i=1}^{12} T_{+y_i}^2 - \sum_{i=13}^{24} T_{-y_i}^2}{\sum_{i=1}^{12} T_{+y_i} + \sum_{i=13}^{24} T_{-y_i}} \quad (10)$$

The two reference values can then be combined as one centroid vector $S_{ges}$ in accordance with magnitude $$|S_{ges}| = \sqrt{T_{xGL}^2 + T_{yGL}^2} \quad (11)$$

and angle $$\varphi_{ges} = \tan\left(\frac{T_{yGL}}{T_{xGL}}\right) \quad (12)$$

The origin of the centroid vector $S_{ges}$ is situated here at the origin of coordinates $P(0,0)$ and ends at the centroid S that lies at the point $P(T_{xGL}, T_{yGL})$. The angle $\varphi_{ges}$ is referred to the positive x-axis in the mathematically positive sense, it being necessary when applying the tangent function to apply the customary considerations for the magnitude of the angle $\phi_{ges}$.

All the determined temperatures $T_i$ are combined in accordance with the above calculation to form a centroid vector $S_{ges}$ in a a time-resolved—that is to say constantly recurring—fashion.

In FIG. 2, the points of the temperatures $T_i$ plotted on the auxiliary axes $H_i$ are interconnected via a circumferential line 22 such that they jointly enclose a polygonal, virtually circular surface 23 whose centroid S is determined by applying the method.

The null vector would necessarily be yielded as centroid vector $S_{ges}$ for an ideal gas turbine 1 with a symmetrical exit temperature distribution.

If the magnitude $|S_{ges}|$ of the centroid vector $S_{ges}$ increases substantially, the exit temperature distribution referring to the origin of the coordinate system is then increasingly deformed. If the magnitude $|S_{ges}|$ decreases, the exit temperature distribution becomes more symmetrical.

Figure 3:
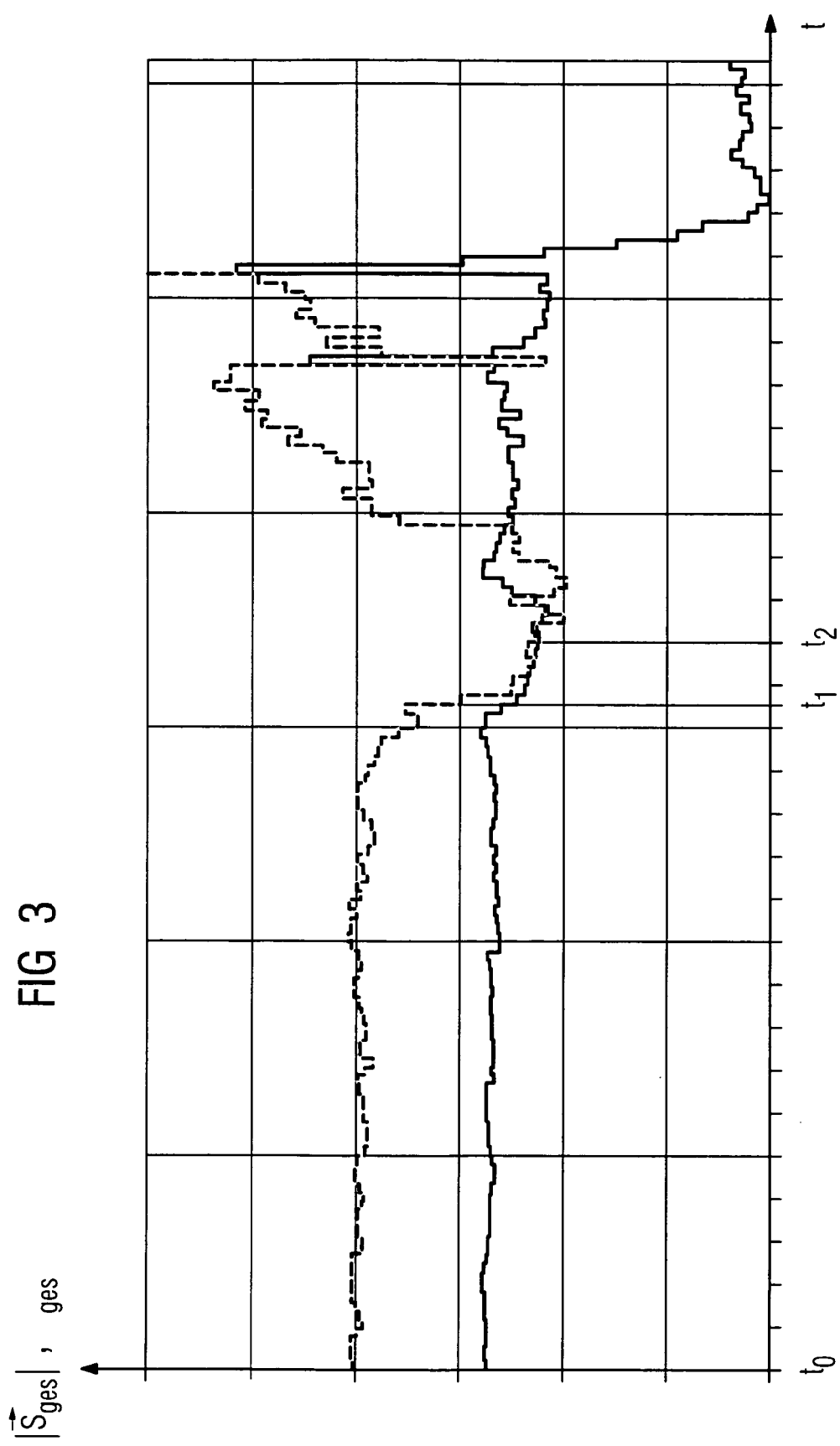
FIG. 3 shows a combined magnitude/time and angle/time diagram for a centroid vector of the exit temperature distribution of the gas turbine.

FIG. 3 illustrates the time profile of the centroid vector $S_{ges}$ in a combined magnitude/time and angle/time diagram. The centroid vector $S_{ges}$ is described by the magnitude $|S_{ges}|$ and the angle $\phi_{ges}$, the angle $\phi_{ges}$ being illustrated with a dashed type of line, and the magnitude $|S_{ges}|$ being illustrated as a continuous line.

In the stationary undisturbed operation of the gas turbine starting from the instant $t=t_0$ up to the instant $t=t_1$, the characteristic of the magnitude $|S_{ges}|$ runs in an approximately constant fashion inside a narrow fluctuation range. The angle $\phi_{ges}$ is likewise to be considered as constant inside a narrow fluctuation range.

At the instant $t=t_1$, a systematic variation that is identified by means of the method occurs during the stationary operation by means of a partial blockade of the turbine entrance space.

Starting from the instant $t=t_1$, the angle $\phi_{ges}$ changes substantially and drops approximately to half of its previous value. Starting from the instant $t=t_2$, the magnitude $|S_{ges}|$ moves outside its fluctuation range. The disturbance can be identified earlier and more easily owing to the not insubstantial change in the angle $\phi_{ges}$ and in the magnitude $|S_{ges}|$.

Although the temperature changes were recorded with the aid of the monitoring methods previously known from the prior art, the slight systematic temperature changes do not overshoot the limiting values, and so no defective operation was diagnosed. Consequently, this case of disturbance—the partial blockade of the turbine entrance space with, resulting therefrom, excitations of vibrations of the first moving vane row, and subsequent vane breakages—was not identified early enough with the aid of a monitoring method in accordance with EP 1 118 920 A1.

The method described in EP 1 118 920 A1 does decompose the determined sliding mean values into two mutually perpendicular components from which a resulting variable having magnitude and angle is determined, but no weighting of the components is performed there, in particular no variable weighting, in the manner of a formation of moments. In the inventive method, each temperature $T_i$, for example the temperature $T_{+xi}$, acts with the lever arm assigned to it, for example $T_{+xi}$ minus $T_{xGL}$,—in a way comparable to a formation of moments in the physical sense—about the centroid S of the surface that is to be determined; in accordance with equations (5) to (8).

The displacement of the centroid S, that is to say the point $P(T_{xGL}, T_{yGL})$, also changes each lever arm and thus the weighting of each temperature $T_i$. Consequently, the inventive method becomes extremely sensitive with respect to the smallest changes in the exit temperature distribution. In addition, the method constitutes a further improvement by comparison with the simple formation of mean values, since this simple formation of mean values, does not necessarily exhibit symmetrical temperature displacements, and provides no information relating to the geometrical alignment and rotation of the exit temperature distribution.

FIG. 4 shows the device for monitoring the centroid vector $S_{ges}$. It has an evaluation device 25 that applies the method. In this case, the evaluation device 25 is connected to all the temperature measuring devices $M_i$ and to a display device 26. The evaluation device 25 uses the detected temperatures $T_i$ to calculate the centroid vector $S_{ges}$, and checks whether the magnitude $|S_{ges}|$ thereof or the angle $\phi_{ges}$ thereof lies outside a tolerance interval. If this is the case, the evaluation device 25 generates a signal for the display device 26 that then displays a disturbance as operating state. The display device 26 can be a monitor or a pilot lamp.

By continuously monitoring the magnitude $|S_{ges}|$ and the angle $\phi_{ges}$, it is possible to identify the temporal change thereof at an early stage as a systematic variation in the absence of an external known influence. These then indicate defects or disturbances at an early stage such that consequential damage to the gas turbine can be avoided, or such that a well-timed intervention can be made in the operation of the turbine for corrective purposes.

The invention claimed is:

1. A method for identifying an operating state during an operation of a turbine having an exhaust gas flowing through an exhaust gas housing downstream of the turbine, comprising:
   detecting temperature values of the exhaust gas in the exhaust gas housing in a time-resolved fashion and in a plane transverse to principal flow direction of the exhaust gas;
   measuring the temperature values of the exhaust gas in a spatially resolved fashion with reference to an origin of an imaginary Cartesian coordinate system;
   projecting the measured temperature values into two axes of the imaginary Cartesian coordinate system;
   decomposing the measured temperature values into two spatial components perpendicular to one another;
   directing the two spatial components either positively or negatively at the imaginary Cartesian coordinate system;
   calculating a moment from a lever arm that is pivoted at two reference values of the two axes of the imaginary Cartesian coordinate system;
   summing up moments for the two axes to form two oppositely directed moment sums;
   evaluating the two reference values from the two moment sums;
   composing a point from the two reference values as a centroid of the temperature distribution; and
   identifying the operating state of the turbine based on the centroid of the temperature distribution.

2. The method as claimed in claim 1, wherein the two respective reference values are selected such that the two oppositely directed moment sums are equal.

3. The method as claimed in claim 1, wherein the lever arm is a multiple of an effective portion of the measured temperature values at one of the two axes with respective one of the two spatial components of the measured temperature values.

4. The method as claimed in claim 1, wherein the centroid is a vector having magnitude and angle, and the operating state is identified as a disturbance when the difference between magnitude or angle of a current centroid vector with reference to magnitude or angle of an earlier measured centroid vector exceeds a tolerance value.

5. The method as claimed in claim 1, wherein the plane is perpendicular to the principal flow direction of the exhaust gas, and the principal flow direction is parallel to a rotation axis of a shaft of the turbine.

6. The method as claimed in claim 1, wherein the measured temperature values are detected at a same spacing from the rotation axis of the shaft of the turbine.

7. The method as claimed in claim 1, wherein the measured temperature values are detected in a fashion rotationally symmetrical relative to the rotation axis of the shaft of the turbine.

8. The method as claimed in claim 1, wherein the operation of the turbine is a stationary operation of the turbine.

9. A device for identifying an operating state during an operation of a turbine having an exhaust gas flowing through an exhaust gas housing downstream of the turbine, comprising:
- a plurality of temperature measuring devices which are arranged along an inner wall of the exhaust gas housing of the turbine and in a plane transverse to principle flow direction of the exhaust gas, the temperature measuring devices providing a plurality of measured temperature values in a time-resolved fashion and in a spatially resolved fashion with reference to an origin of an imaginary Cartesian coordinate system;
- a projector that projects the measured temperature values into two axes of the imaginary Cartesian coordinate system and decomposes the measured temperature values into two spatial components perpendicular to one another that are directed either positively or negatively at the imaginary Cartesian coordinate system;
- a calculator that calculates a moment from a lever arm that is pivoted at two reference values of the two axes of the imaginary Cartesian coordinate system and sum up moments for the two axes to form two oppositely directed moment sums; and
- an evaluation device that evaluates the two respectively reference values from the two moment sums and compose a point from the two reference values as a centroid of the temperature distribution and identifies the operating state of the turbine based on the centroid of the temperature distribution.

10. The device as claimed in claim 9, wherein the measured temperature values are inputs of the evaluation device.

11. The device as claimed in claim 9, wherein a signal of the operating state is displayed as an output of the evaluation device.

12. The device as claimed in claim 9, wherein the evaluation device is connected to the temperature measuring devices.

13. The device as claimed in claim 9, wherein the plane is perpendicular to the principal flow direction of the exhaust gas, and the principal flow direction is parallel to a rotation axis of a shaft of the turbine.

14. The device as claimed in claim 9, wherein the measured temperature values are detected at a same spacing from the rotation axis of the shaft of the turbine.

15. The device as claimed in claim 9, wherein the measured temperature values are detected in a fashion rotationally symmetrical relative to the rotation axis of the shaft of the turbine.

16. The device as claimed in claim 9, wherein the turbine has an annular combustion chamber with a plurality of burners and the number of the burners is equal to the number of measuring devices.

17. The device as claimed in claim 9, wherein the turbine has a plurality of combustion chambers with one burner and the number of the combustion chambers is equal to the number of measuring devices.

18. The device as claimed in claim 9, wherein the turbine is a gas turbine.

* * * * *